350-392 SR

XR 3,521,271

July 21, 1970 R. A. RAPPAPORT 3,521,271

ELECTRO-OPTICAL ANALOG TO DIGITAL CONVERTER

Filed July 15, 1966

INVENTOR.
RICHARD A. RAPPAPORT
BY Dicke + Craig
ATTORNEYS

3521271
OR IN 340/347R

United States Patent Office 3,521,271

Patented July 21, 1970

3,521,271

ELECTRO-OPTICAL ANALOG TO DIGITAL CONVERTER

Richard A. Rappaport, Henrietta, N.Y., assignor to Stromberg-Carlson Corporation, Rochester, N.Y., a corporation of Delaware Filed July 15, 1966, Ser. No. 565,596

Int. Cl. G08c 9/06

U.S. Cl. 340—347 3 Claims

ABSTRACT OF THE DISCLOSURE

Electro-optical apparatus is disclosed wherein an analog signal is applied to a motor circuit that pivotally rotates a beam of radiation by an angle corresponding to the amplitude of the analog signal. The beam of radiation is directed through a digital mask and is detected and gated to provide the digital signal.

Figure 1:
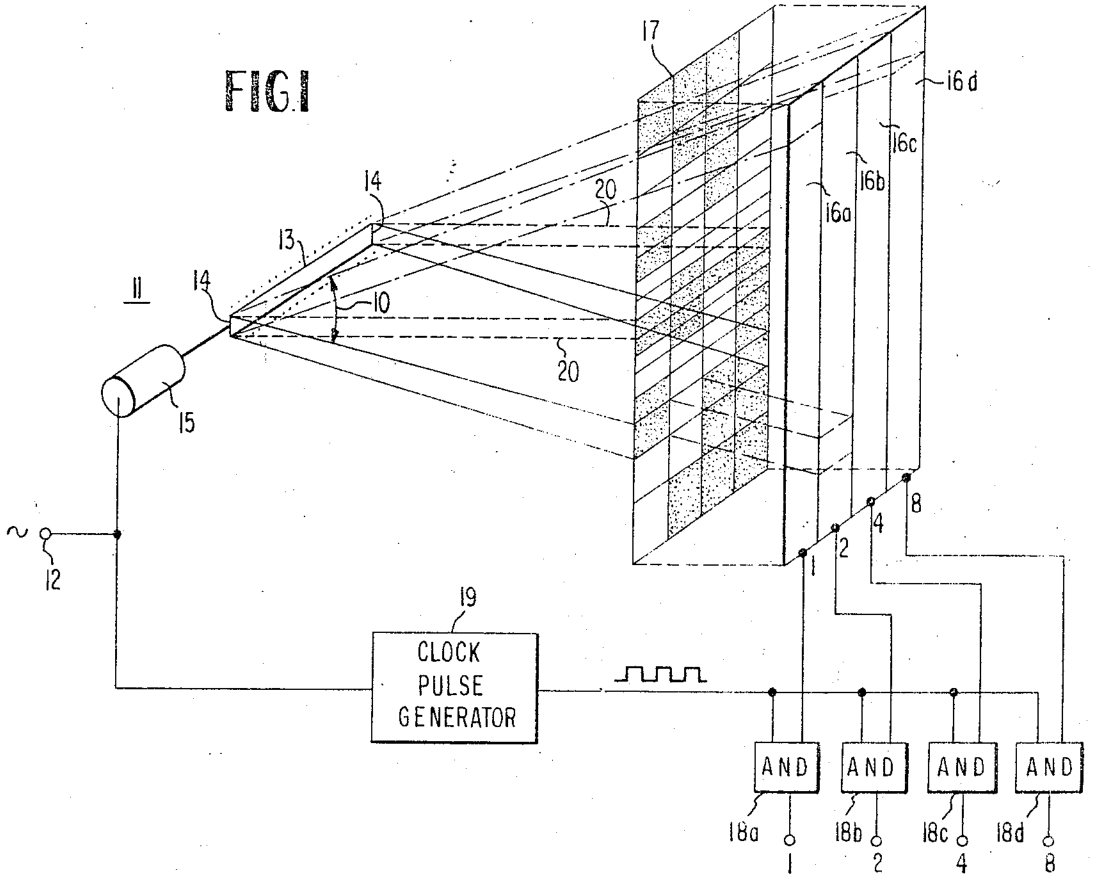

This invention relates to a new and improved electro-optical analog to digital converter.

More particularly, the invention relates to a relatively simple and inexpensive analog to digital converter, for processing an analog electrical input signal by compressing, quantizing and coding it through electro-optical means, and deriving a coded, pulsed electric output signal in digital form which is representative of a range of instantaneous values of the input analog signal.

Because of the increasing use of digital computers and data-processing equipment in manufacturing processes for control purposes, data-processing, vehicle and machine tool control, etc., there has been a continuing demand for better, simpler and more inexpensive devices for converting information in analog form to digital form. The analog information in its original setting can appear in almost any form as by a rise and fall of a column of mercury due to variations in temperature, pressure, etc., rotation of a shaft, linear movement of a mass as in an accelerometer, etc., all of which forms are readily converted to an analog electric signal of varying amplitude or frequency. The difficulty encountered heretofore has been in the conversion of the analog electric signal to a digital-type signal usable with digital computers, digital data-processing equipment, and the like.

It is therefore a primary purpose of the present invention to provide a relatively simple and economical analog to digital converter for converting input electrical signals in analog form to output electric signals in coded, digital form.

A feature of the invention is the provision of an analog to digital converter for processing an input analog electrical signal by compressing, quantizing, and coding it through electro-optical means, and deriving a coded, pulsed, electric output signal in digital form which is representative of a range of instantaneous values of the input analog signal.

In practicing the invention, an electro-optical analog to digital converter is provided which includes electro-optical conversion means for converting an input electric signal in analog form to a modulated light signal. The electro-optical conversion means comprises means for producing a narrow band of light having a length proportional to the number of bands of binary information channels into which the analog information is to be converted, and means for deflecting this band of light in a direction transverse to the length thereof proportional to the instantaneous value of the analog signal. Photosensitive means are disposed in the optical path of the electrooptical conversion means, and are comprised by a plurality of photosensitive surfaces proportional in number to the number of bands of binary information channels into which the analog information is to be compressed by the converter. These photosensitive surfaces are electrically isolated one from the other. Coded mask means are interposed in the optical path between the electro-optical conversion means and the photosensitive means for intercepting light at certain points and passing light to the photosensitive surfaces at other points in accordance with a predetermined code. The converter is completed by means for deriving output electric signals in digital form from the individual photosensitive surfaces which are electrically isolated one from the other. In a preferred form of the invention, the photosensitive surfaces comprise elongated photovoltaic plates which extend in the direction of deflection of the narrow band of light. Also, in the preferred embodiment of the invention, the mask is coded in accordance with the gray code and is logarithmically arranged to provide for compression of the analog signal whereby each range of analog input levels causes the narrow band of light to strike a particular code arrangement.

Figures 2, 3:
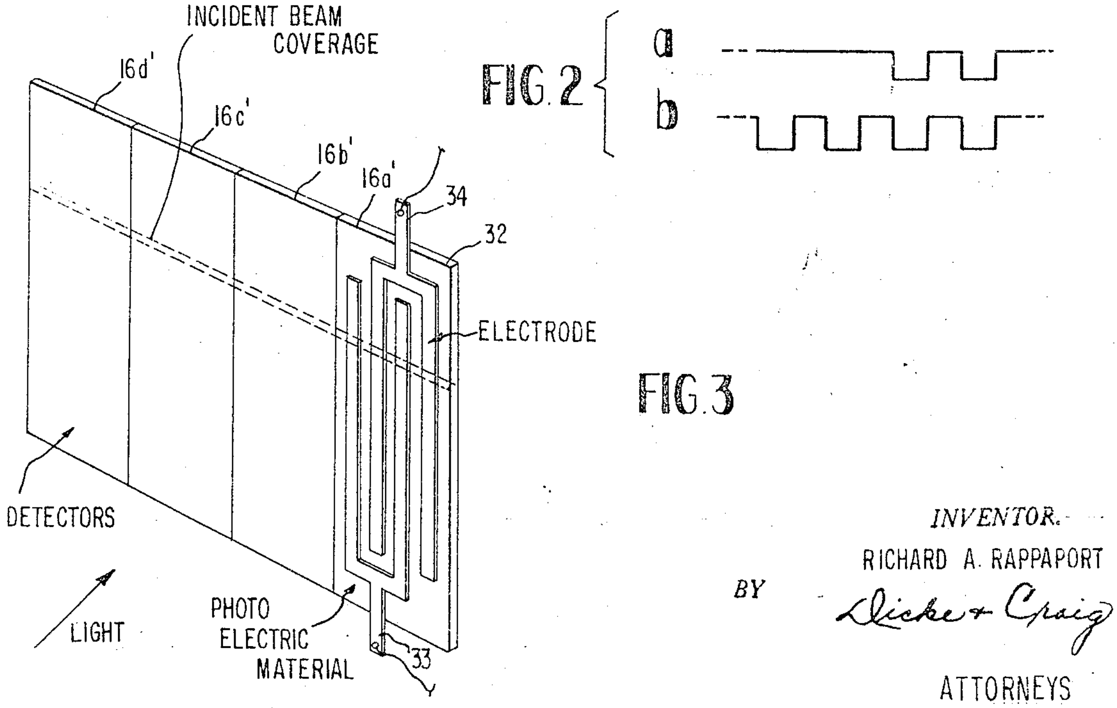

Other objects, features, and many of the attendant advantages of this invention will be appreciated more readily as the same becomes better understood by reference to the following detailed description, when considered in connection with the accompanying drawings, wherein:

FIG. 1 is a functional block diagram of one embodiment of a new and improved analog to digital converter constructed in accordance with the invention; and FIG. 2 illustrates a series of voltage versus time electrical signal wave shapes depicting the nature of the digital output signal derived by the converter of FIG. 1;

FIG. 3 discloses details of one embodiment of a photosensitive detector usable in the invention.

The electro-optical analog to digital converter shown in FIG. 1 is comprised by electro-optical conversion means 11 for converting an input electrical signal in analog form applied to the input terminal 12 into a modulated light signal. The electro-optical conversion means 11 may comprise a visicorder which generally includes a means for producing a narrow band of light indicated at 13 which can be deflected up or down as shown by the arrow at 10 in a direction transverse to its length about pivot points 14 by a suitable driving mechanism 15 having the analog signal to be converted applied to its input through the medium of input terminal 12. The visicorder is a device which is well known in the art, and is described in greater detail in the reference entitled: Honeywell Catalogue, D 2011, October 1963, Model 1108, Direct Recording Visicorder Oscillograph. In place of the visicorder, the electro-optical conversion means 11 might also comprise a cathode ray tube preferably having a rectangular face and designed to provide a wide, relatively narrow beam of electrons impinging on the phosphorus surface thereof so as to produce the narrow band of light 13 as depicted in FIG. 1. The narrow band of light thus produced could then be deflected up or down in a direction transverse to its length in the same manner as the visicorder. Whether the visicorder, the cathode ray tube arrangement, or some other means is employed, it is necessary that the narrow band of light has a length which is proportional to the number of bands of binary information channels into which the analog information is to be compressed by the converter. The purpose of this requirement will become apparent from the following description.

Photosensitive means preferably comprised by a plurality of individual elongated photovoltaic plates 16*a* through 16*d* are disposed in the optical path of the band of light 13 so as to have the light rays therefrom impinge on selected parts of the photosensitive surfaces of these plates. The plurality of photovoltaic plates 16*a* through 16*d*, and hence the photosensitive surfaces thereof, are proportional in number to the number of bands of binary information channels into which the analog information is to be compressed by the converter, and are electrically isolated one from the other. The photovoltaic plates 16a through 16d may comprise a single layer of selenium having a cuprous oxide surface formed thereon to comprise a barrier layer, or alternatively may comprise a series array of interconnected barrier-layer cells of selenium and cuprous oxide. Alternatively, it would be possible to employ other photosensitive surfaces such as silicon wafers having small amounts of N-type and P-type impurities formed thereon in a well known manner.

While photovoltaic surfaces are to be preferred, it would also be possible to employ photoelectric or photo-conductive surfaces in the fabrication of the photosensitive means as shown in FIG. 3 of the drawings. Referring to FIG. 3, the photosensitive detectors 16a', 16b', 16c' are each made up of a backing member 32 of a solid-state photoelectric material such as cadmium sulphide or cadmium selenide, on which electrodes 33 and 34 of a conductive material such as copper, silver, etc. are deposited. Application of an energizing potential across the electrodes 33 and 34 will give rise to a current flow through an output load terminal connected with the energizing potential across the electrodes 33 and 34. This current flow will be in proportion to the amount of light impinging on the photoelectric material but this effect is not important in the instant application so long as the signal level is sufficient to be readily detectible. If desired the photosensitive means 16a'–16d' could be in the form of light sensitive resistor, and the desired end result could still be obtained. With either alternative arrangement, however, the use of photoelectric or photoconductive surfaces would require the employment of a separate power supply which would tend to further complicate the construction, and hence the cost of the converter. For this reason, the photovoltaic plate arrangement described above is preferred.

Coded mask means indicated at 17 is interposed in the optical path between the electro-optical conversion means 11 and the photosensitive surfaces 16a through 16d in accordance with a predetermined code. The mask 17 preferably is fabricated from a very thin light opaque member having holes or openings formed therein in accordance with the gray code and logarithmically arranged to provide for compression of the analog information into the number of binary information channels into which the analog information is to be compressed by the converter. For this purpose the vertically arranged spaces on the mask having varying widths starting from the smallest width at the center neutral position, and increasing in width as one proceeds up or down from this center neutral position. The number of binary information channels is determined by the number of photosensitive surfaces 16a through 16d, the number of which of course may be varied to accommodate any desired number of binary information channels. About the only limitation on this number is the length of the narrow band of light 13 and the number of discrete or individually electrically isolated photosensitive surfaces which can be accommodated within the width allowed. Also, it should be noted that while the mask 17 has been described as being logarithmically arranged, any type of compression can easily be introduced by appropriate design of the coded mask 17. Hence, by appropriate modification of the number of photosensitive surfaces 16a through 16d, and design of the mask 17, any type of compression can be easily set up, many more quantizing levels can be used, and a higher bit code can be introduced. It should also be noted that the coded mask and photovoltaic cells could be formed in a cylindrical shape about the light source. This would then place each part of the photovoltaic cells an equal distance from the light source.

The electric signals derived by the photosensitive plates 16a through 16d are applied, respectively, to one input terminal of an associated AND circuit 18a through 18d. The AND circuits 18a through 18d have their remaining input terminal connected to the output from a clock pulse signal generator 19 which serves to develop a series of square-wave shaped clock pulses as indicated in FIG. 2b of the drawings. Means are also provided for interconnecting a gating-on input terminal of the clock pulses signal generator 19 to the input terminal 12 so as to synchronize the operation of the clock pulse generator 19 with the operation of the electro-optical conversion means 11. Coded output electric signals may be derived from the output terminals of the AND circuits 18a through 18d. By assigning a binary weight to each of these output terminals (and hence to its associated photovoltaic plate 16a to 16d) a sequential binary coded output signal may be derived from the device. As indicated in FIG. 1, the left most AND circuit 18a is assigned a binary weight of "1," 18b a binary weight of "2," and the weighting increases from left to right as indicated in accordance with the binary code.

In operation, the electro-optical analog to digital converter takes an analog input signal applied to its input terminal 12 in electric form, compresses it, quantizes it, and codes it into a gray code. The particular arrangement illustrated in FIG. 1 compresses logarithmically, quantizing into fifteen levels, and derives an output four-bit coded signal at the output terminals of the AND circuits 18a through 18d. For this purpose, the electro-optical conversion means causes the band of light 13 to be deflected vertically up and down in a direction transverse to its length so as to cause the band of light depicted by the dotted lines 20 to move up or down over the surface of the coded mask 17. The band of light 20 will be moved either upward or downward depending upon the polarity and amplitude of the input signal applied to input terminal 12. It is assumed that in the position shown, the band of light 20 is at zero input level. Accordingly, for each range of analog input levels, the band of light 20 will strike a particular code arrangement on the face of the coded mask 17. The mask 17 therefore will perform the function of quantizing by partially blocking part of the light in accordance with its predesigned code and allowing only a predetermined pattern of light to strike the photosensitive surfaces 16a through 16d.

As a consequence of the light impinging on certain ones of the photosensitive surfaces of photovoltaic plates 16a through 16d, an electric potential will be developed thereacross which are applied to the input of its associated AND circuit 18a through 18d. Concurrently, the clock signal pulses are applied to the remaining input terminals of AND circuits 18a through 18d. Where coincidence occurs between a clock signal pulse and a voltage on one of the photosensitive surfaces 16a through 16d, an output signal pulse as depicted in FIG. 2a will appear at the output terminals of the AND circuits 18a through 18d. As stated above, each of the output terminals of the AND circuits 18a through 18d are assigned a particular binary weight so that as a result, a discrete characteristic coded output signal will be derived which is representative of an instantaneous range of values of the input analog signal.

From the foregoing description, it can be appreciated that the invention provides a relatively simple and inexpensive analog to digital converter for processing an analog electrical input signal by compressing, quantizing and coding it through electro-optical means, and deriving a coded, pulsed electric output signal in digital form which is representative of a range of instantaneous values of the input analog signal.

Having described one embodiment of a new and improved analog to digital converter constructed in accordance with the invention, it is believed obvious that other modifications and variations of the invention are possible in the light of the above teachings. It is therefore to be understood that changes may be made in the particular embodiment of the invention described which are within the full intended scope of the invention as defined by the appended claims.

I claim:

1. Electro-optical apparatus for converting electrical analog signals into electrical signals in digital code having a preset number of weighted values comprising:

a digital mask formed with radiation opaque and transparent portions arranged in a geometric pattern, said pattern having a number of channels, one for each of the weighted values in said digital code and with the channels divided into a plurality of bands and wherein said opaque and transparent portions are arranged in each band so that separate bands correspond to separate digital numbers in said digital code;

means for directing a beam of radiation on said digital mask, said beam of radiation having an elongated cross section wherein at least a portion of each of said channels is irradiated;

means for pivotally mounting said directing means so that it can be pivoted in a direction transverse the beam to scan said beam across said digital mask from one band to the next;

an input circuit for receiving analog electrical signals to be converted;

motor means coupled between said input circuit and said directing means being responsive to analog signals for pivoting said directing means about said mounting means by an angle that is a function of the amplitude of the analog signals;

a plurality of photodetector circuits, one photodetector circuit for each of said channels in said digital mask wherein separate photodetector circuits receive radiation directed through separate channels, each photodetector circuit including a pair of Y-shaped electrodes deposited on photosensitive surfaces so that said radiation beam impinging on said surfaces causes an electric current to flow between said electrodes;

a plurality of gating circuits, at least a separate gating circuit for each of said photodetector circuits;

a clock pulse generator;

circuit means connecting said gating circuits to said clock pulse generator for receiving timing pulses; and circuit means coupling separate ones of said gating circuits to separate ones of said photodetector circuits whereby said plurality of gating circuits, in response to timing pulses, provide an output signal in digital code corresponding to the amplitude of said analog signal.

2. The electro-optical apparatus as defined in claim 1 wherein the size of said bands in said digital mask varies to provide a non-linear conversion.

3. The electro-optical apparatus as defined in claim 2 wherein the size of said band in said digital mask varies to provide a logarithmic conversion of said analog signal into said digital code.

References Cited

UNITED STATES PATENTS

| | | | |
|---|---|---|---|
| 2,994,863 | 8/1961 | Trapnell | 340—347 |
| 3,015,814 | 1/1962 | Lippel | 340—347 |
| 3,037,077 | 5/1962 | Williams et al. | 340—347 |
| 3,286,032 | 11/1966 | Baum | 340—347 |
| 3,231,884 | 1/1966 | Higgins | 340—347 |

MAYNARD R. WILBUR, Primary Examiner

J. GLASSMAN, Assistant Examiner

U.S. Cl. X.R.

235—61.11